US010022572B2

(12) United States Patent
Wolter

(10) Patent No.: US 10,022,572 B2
(45) Date of Patent: Jul. 17, 2018

(54) SYSTEM FOR ASSEMBLY OF PROVISIONAL HORIZONTAL LIFELINES

(71) Applicant: Tulio Roberto Wolter, São Paulo (BR)

(72) Inventor: Tulio Roberto Wolter, São Paulo (BR)

( * ) Notice: Subject to any disclaimer, the term of this patent is extended or adjusted under 35 U.S.C. 154(b) by 36 days.

(21) Appl. No.: 15/229,861

(22) Filed: Aug. 5, 2016

(65) Prior Publication Data

US 2017/0050060 A1 Feb. 23, 2017

(30) Foreign Application Priority Data

Aug. 19, 2015 (BR) ............................ 102015019922

(51) Int. Cl.
*F16L 3/08* (2006.01)
*A62B 35/00* (2006.01)

(52) U.S. Cl.
CPC ...... *A62B 35/0056* (2013.01); *A62B 35/0068* (2013.01)

(58) Field of Classification Search
USPC ........................................ 248/218.4; 182/113
See application file for complete search history.

(56) References Cited

U.S. PATENT DOCUMENTS 2,706,662 A 4/1955 Brown
3,881,699 A * 5/1975 Nusbaum ............ E04G 21/3223 182/82
3,949,834 A * 4/1976 Nusbaum ............ E04G 21/3261 182/138
4,037,824 A 7/1977 Whitmer et al.
5,125,477 A * 6/1992 Jordan, III ................ E04G 5/14 182/113
6,036,146 A * 3/2000 Paterson ............ A62B 35/0056 182/113
6,053,281 A * 4/2000 Murray ............... E04G 21/3223 182/113
6,779,630 B2 * 8/2004 Choate ............... A62B 35/0056 182/3
7,048,090 B2 * 5/2006 Dean .................. A62B 35/0056 182/3
8,627,923 B2 * 1/2014 Sidla .................. A62B 35/0056 182/3
8,997,926 B2 * 4/2015 O'Reilly ............ A62B 35/0056 182/3

(Continued)

*Primary Examiner* — Monica E Millner
(74) *Attorney, Agent, or Firm* — B. Aaron Schulman, Esq.; Stites & Harbison, PLLC

(57) ABSTRACT

A system for assembly of a lifeline of the type that uses an anchor post and retractable drum assembly to horizontally stretch the mentioned as a means to protect workers constructing buildings or other structures from falls; the anchor post is modular and can be coupled to complementary tube(s) with telescopic adjustment means; said modular anchor post being provided with (i) a structural base with a plane region and ribs welded to the side of the post so as to keep said plane slightly removed from said anchor post; a hole drilled in the ground of the building receives the tubular sector, arranged between the end and the plane region; (ii) by at least one safety guide, formed by three arched segments; (iii) by at least one transport handle in a single piece; and (iv) by at least two brackets for mounting and attaching the retractable lifeline drum assembly, optimizing the ways of holding the lifeline stretched horizontally.

10 Claims, 6 Drawing Sheets

(56) References Cited

U.S. PATENT DOCUMENTS

| | | | | |
|---|---|---|---|---|
| 2006/0272891 | A1* | 12/2006 | Casebolt | A62B 1/04 182/36 |
| 2008/0035423 | A1* | 2/2008 | Meillet | A62B 35/0056 182/3 |
| 2008/0041661 | A1* | 2/2008 | Meillet | A62B 35/0093 182/13 |
| 2009/0020363 | A1* | 1/2009 | Ingalls | E04G 5/00 182/113 |
| 2011/0315474 | A1* | 12/2011 | Wiser | A62B 35/0056 182/3 |
| 2014/0360809 | A1* | 12/2014 | Alguire | A62B 35/0056 182/36 |
| 2017/0028232 | A1* | 2/2017 | Watanabe | E04G 5/001 |

* cited by examiner 10
12
30
LL 10
12
LL
S1
S2
12a
12b
12c
12a/12c

SYSTEM FOR ASSEMBLY OF PROVISIONAL HORIZONTAL LIFELINES

FIELD OF THE INVENTION

The present invention in the field of systems to assemble a provisional horizontal lifeline, to protect workers, constructing buildings or other structures, from falling.

BACKGROUND OF THE INVENTION

According to statistics, accidents involving falls from heights are the leading cause of severe injuries and deaths in the workplace. Approximately one in every seven work-related fatalities is caused by falling from heights. Recent studies point to the lack of appropriate working conditions as the main factor for the increase in these numbers.

In March 2012, Edict 313 from the Secretariat of Labor Inspection (SIT) was published in the Official Federal Gazette, approving Regulatory Standard [*Norma Regulamentadora*] no. 35—Work at Heights. This new NR establishes the minimum requirements and the protection measures involving the planning, organization and execution of work at heights, so as to guarantee the safety and health of workers directly or indirectly involved in this type of activity.

Various systems are available in the market. These differ significantly in design and application. Characteristics of safety, functions, handling and ease of use must be evaluated. Besides this, durability, maintenance costs and long-term value should be considered to select the best system. In all cases, fall-arresting systems should be designed for each specific application. This will minimize the risk of falling from heights and maximize the efficiency of the work to be performed.

Lifeline systems, as they are known today, are regulated by NR 18 and involve installation of a cable or rope connected to a safety harness to secure the worker, and anchor points, with the objective of allowing people to work at heights safely.

There are two types of lifelines according to the time frame of use. The most often utilized are provisional or temporary, which are assembled, used and disassembled in the phase of the work project in which they are necessary. And there are also fixed ones that are installed and remain during the entire project.

The provisional horizontal lifeline is a means to anchor against falls and is normally composed of a metal cable, generally stored on a drum with a retraction and locking mechanism, as well as a free end with a means of attachment, in the form of a snap hook or similar device. The system as a whole is designed to adjust to the structures and anchor points, which are demonstrably able to withstand the forces exerted by a fall. For example, the lifeline has at least two anchor points, preferably in the form of a post or brace, made of metal, wood or other material, which are attached to the lifeline.

These systems are produced for specific uses. The worker can use a safety belt and a fastening component (for example, a baldric with energy absorber or a retractable fall arrester) that connects to the lifeline by a trolley wheel of shuttle, able to pass freely through intermediate supports. Therefore, the worker can move horizontally with total safety, because he is connected to the system at all times.

However, many of these systems present some insecure points, because as is known to practitioners, in a possible fall of a worker connected to a horizontal lifeline, the forces generated at the ends of this lifeline are amplified and can damage the support structures of the system and impair the worker's safety. This effect can be multiplied when multiple workers use the same lifeline.

The drawbacks of the current systems are concentrated, more specifically, in the support points, such as anchor posts and the lifeline drum. The anchor posts are generally made in the form of steel tubes and are attached with their lower ends driven into the by the fact that the, so as to remain vertical. Many times their length exceeds more than two or three floors of the building under construction, making them hard to transport. Besides this, although these posts generally serve as a means to secure the lifeline, the line is often wound around the post, in direction of the other, where it is also wound or tied, to compose the horizontal lifeline.

Some anchor posts have safety guides or holes through which the lifeline passes. For example, document U.S. Pat. No. 4,037,824 (WHITMER) contemplates an anchor post provided with two small parts forming an arch, which together form a "U" fastened to the top of said anchor post. In turn, document U.S. Pat. No. 2,706,662 (DOYES) contemplates at least one "C" link welded to the side of a post.

Therefore, as seen, the "U" links commonly used are not sufficiently closed, and thus do not prevent the detachment of the lifeline when a high force is placed on it. In turn, the "C" link welded to the post means that the lifeline can only be passed though the link from its free end. If there is a need to attach a portion of the lifeline other than its free end, the worker must splice it to the post, not generating any safety.

Another drawback is the fact that the retractable lifeline drums are fastened to these types of links from the anchor posts. For example, the document from the state of the art US2008035423 (D. B. Ind.) demonstrates that the guide of the retractable drum mechanism is mounted on a "C" link welded to the anchor post, so that said mechanism can move freely, according to the movement imposed by the worker on the lifeline, which even when stretched can present considerable swinging motion, fruit of the freedom of movement of the drum in relation to the safety point of the anchor post. This swinging of the lifeline generates severe instability for the worker.

Therefore, it is clear that the current technical state of horizontal lifeline systems, even though in constant evolution in response to current technical standards, requires improvements related to the anchoring devices, mainly aimed at safety of the workers. However, these improvements should not make the work more costly.

SUMMARY OF THE INVENTION

The present invention seeks to provide a system to assemble a provisional horizontal lifeline, more particularly involving the energy absorber conceived to be included as a means to protect workers constructing buildings or other structures against falling; providing means to optimize the ways of securing the lifeline in the horizontal position.

The objective of the present invention is thus to provide a system for assembly of a provisional horizontal lifeline, where the main improvements are made on the anchor post, to substantially increase the safety of workers.

Another objective of the present invention is not to increase the cost of producing the anchor post, so that the cost of the work can be maintained within the patterns currently established.

Another objective of the present invention is to provide a modular anchor post, provided with a transport handle that is simple to produce, permitting a single worker to load and position the anchor post at the place of installation. This new anchor post model includes a base for stability formed by at least four triangular structural reinforcements welded on a base that expands the structure of the anchor post, preventing it from falling over when a force is placed on the lifeline.

The modular anchor post can be extended by means of a coupling from a sector of a tube. The telescopic assembly between both is done by means of a locking pin, which can be from the transport handle itself, passing through holes in the anchor post and in the sector of tube. This model of anchor post and tube has a length that permits easy transport and easy assembly at the worksite.

Another objective of the present invention is to cause one of the improvements applied to the anchor post to serve for support and attachment of the drum of the retraction mechanism, preventing it from moving, assuring greater safety of the worker, since the lifeline, after being extended, remains firm during the movement of the mentioned worker.

Another objective of the present invention is a new format for the safety guide through which the lifeline passes, or also to the attachment at the line's end. This safety guide model, unlike conventional ones, serves both for the line passage and for attachment of the lifeline, for which purpose it has three arched segments that present one of the ends welded on the side of the anchor post so as to remain parallel, closely spaced between each other and with the other end away from the side of the post. However, the three arches are mounted with the opening inverted, composing a "passageway" for passage of the lifeline or the hook at the end of said lifeline. Hence, the conformation and position of the arches that compose the safety guide guarantee full safety of the lifeline, preventing its involuntary unwinding, and at the same time, being easy to assemble by the worker.

BRIEF DESCRIPTION OF THE FIGURES

FIGS. 5A and 5B illustrate the innovative safety guide, in which FIG. 5A shows the safety guide with the lifeline passing through and FIG. 5B shows the safety guide supporting the hook at the end of the lifeline.

DETAILED DESCRIPTION OF THE INVENTION

A system (1) for assembling a lifeline (LL) having an anchor post (10) and retractable drum assembly (20) for horizontal stretching of the mentioned lifeline (LL) as a means to protect workers who are engaged in construction of buildings (B) and other structures from falling.

Figure 1:
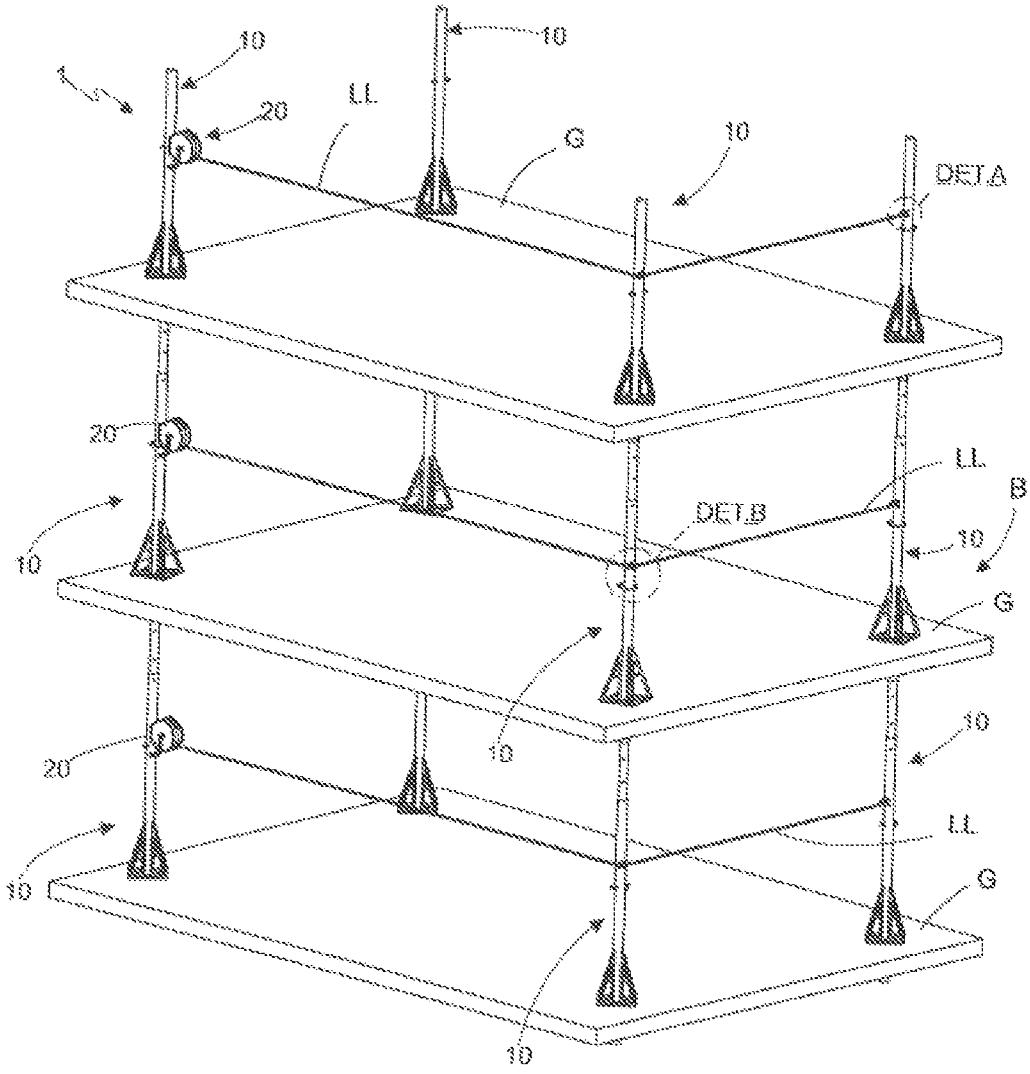
FIG. 1 illustrates a building under construction in a schematic view of three floors, each one equipped with the lifeline system improved hereby.
Figure 2:
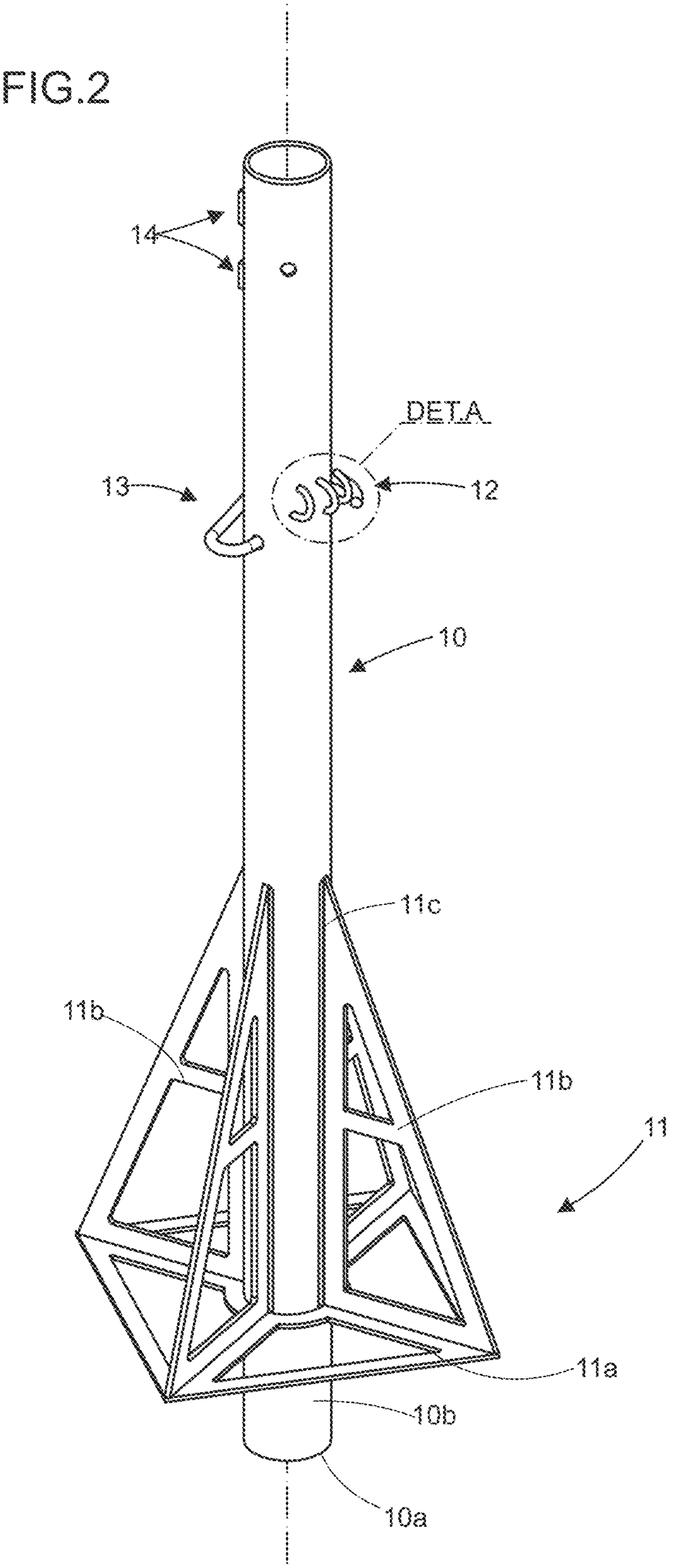
FIG. 2 represents the modular anchor post with the improvements proposed by this invention.
Figure 3:
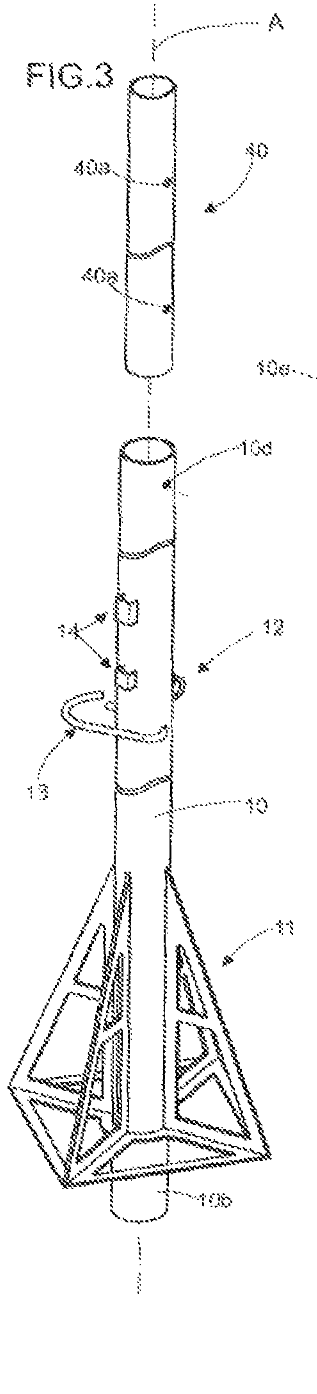
FIG. 3 shows the same modular anchor post with the extendable tube in exploded position.
Figure 4:
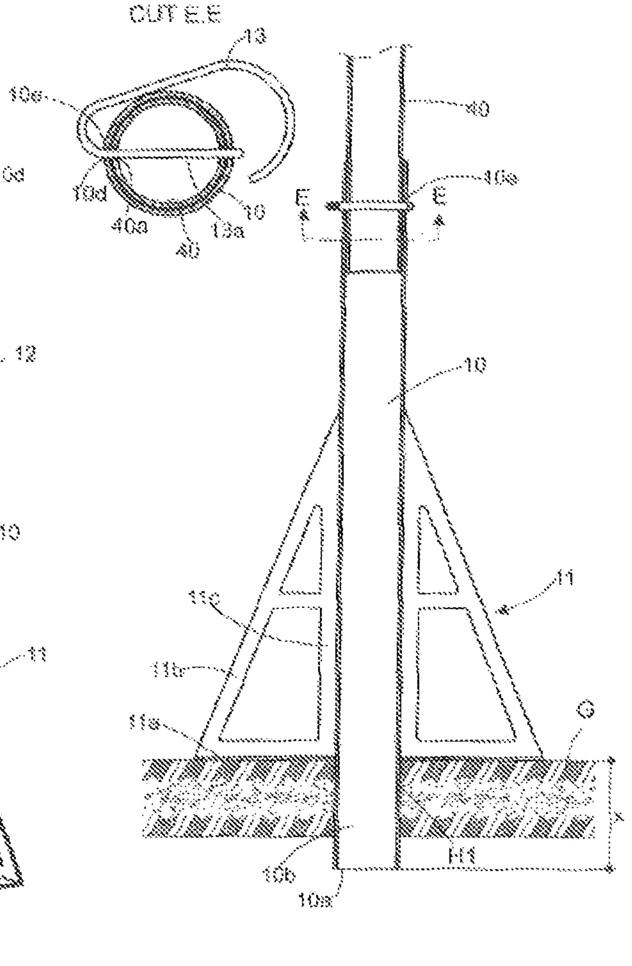
FIG. 4 is a cross-section side view of the modular anchor post coupled to the extendable tube.

According to the present invention, the anchor post (10) is modular, i.e., is formed by a tube with length of approximately 2.50 m, provided with a structural base (11) at a distance of at least 30 cm (x) (FIG. 4) from the bottom end (10*a*) of the post (10). Said structural base (11) is formed by a plane region (11*a*), which is maintained orthogonal to the axis (A) of the post and rigidly stabilized by angular ribs (11*b*), whose vertical rib (11*c*), of each angular rib (11*b*), is welded to the side of the post (10) so as to keep said plane (11*a*) at a slight distance from said anchor post. The tubular sector (10*b*), arranged between the end (10*a*) and the plane region (11*a*), is inserted in the hole (H1) drilled in the ground (G) of the building (B).

Said modular anchor post also includes at least one safety guide (12), one transport handle (13) and brackets (14) for assembly and attachment of the retractable lifeline drum assembly.

Figures 5A, 5B:
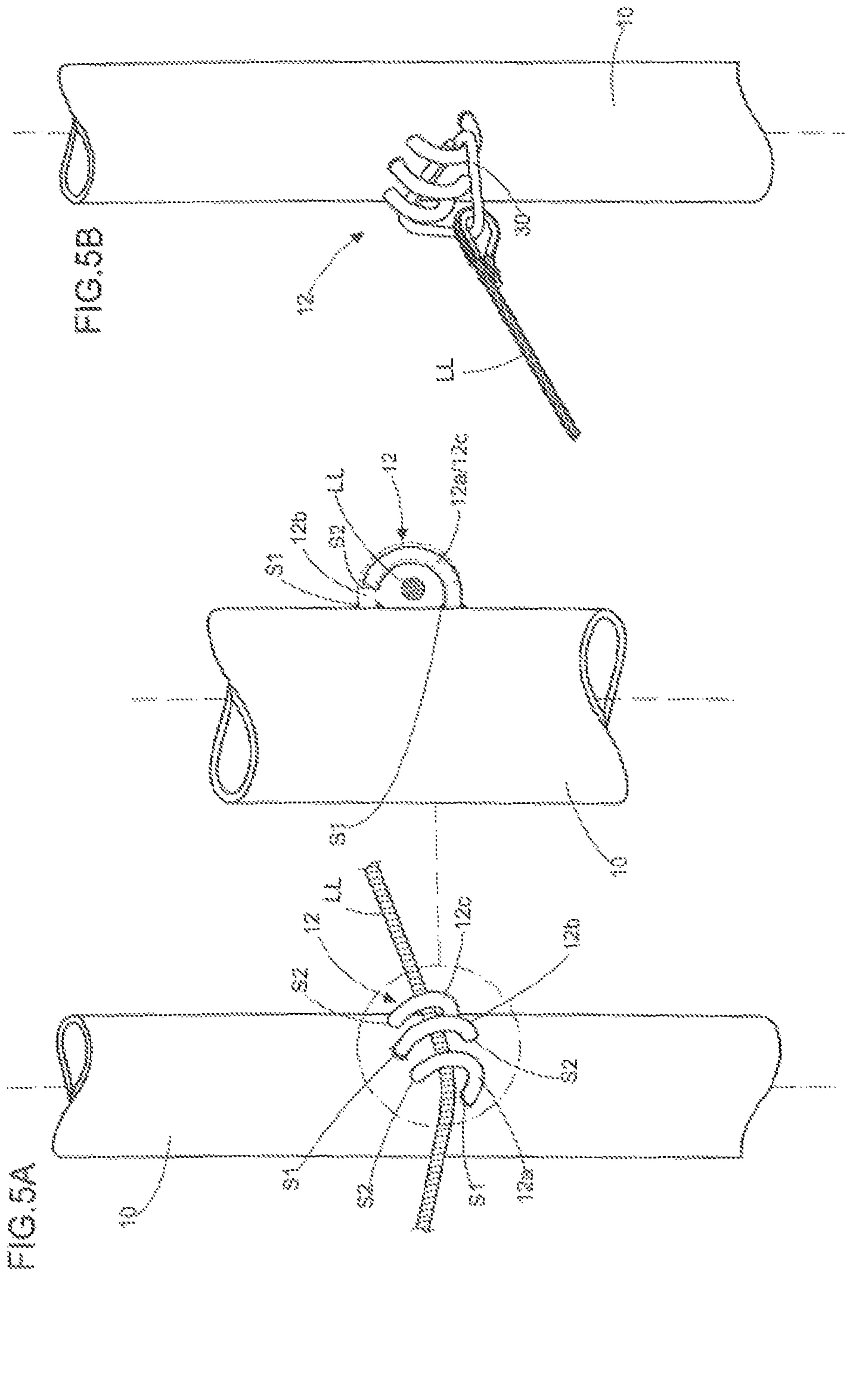
Figure 8:
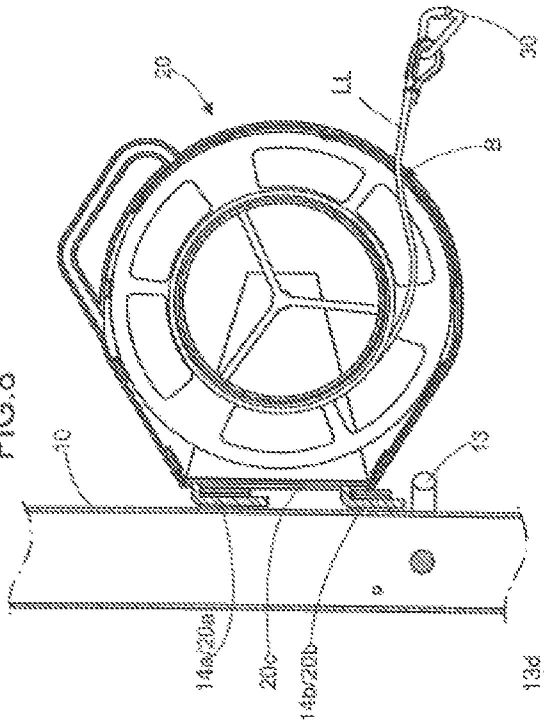
FIG. 8 illustrates the retractable lifeline drum assembly in a cross-sectional side view, attached to the brackets supporting the modular anchor post.
Figure 7:
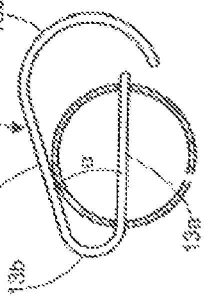
FIG. 7 contains a cutaway view of the anchor post to enable better visualization of the transport handle model.
Figure 6:
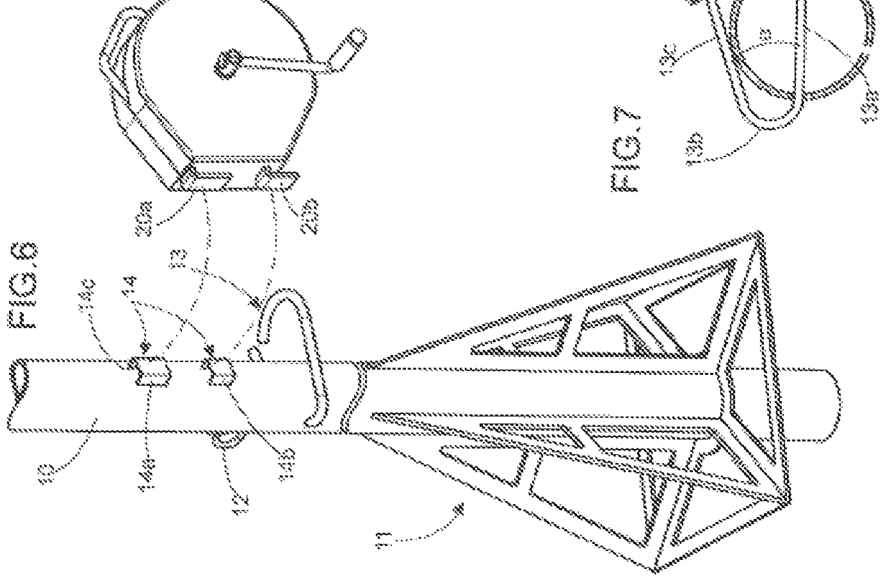
FIG. 6 represents a perspective of the modular anchor post, illustrating in highlight the transport handle and support brackets of the retractable lifeline drum.
Figure 10:
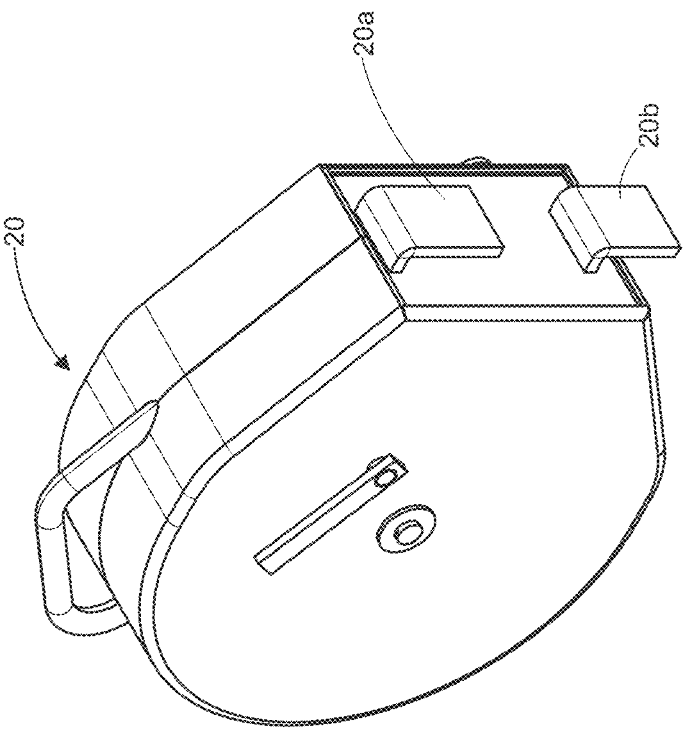
FIGS. 9 and 10 illustrate the retractable lifeline drum assembly in front and back views, in the latter case showing the pair of hooks corresponding to the support brackets of the anchor post.
Figure 9:
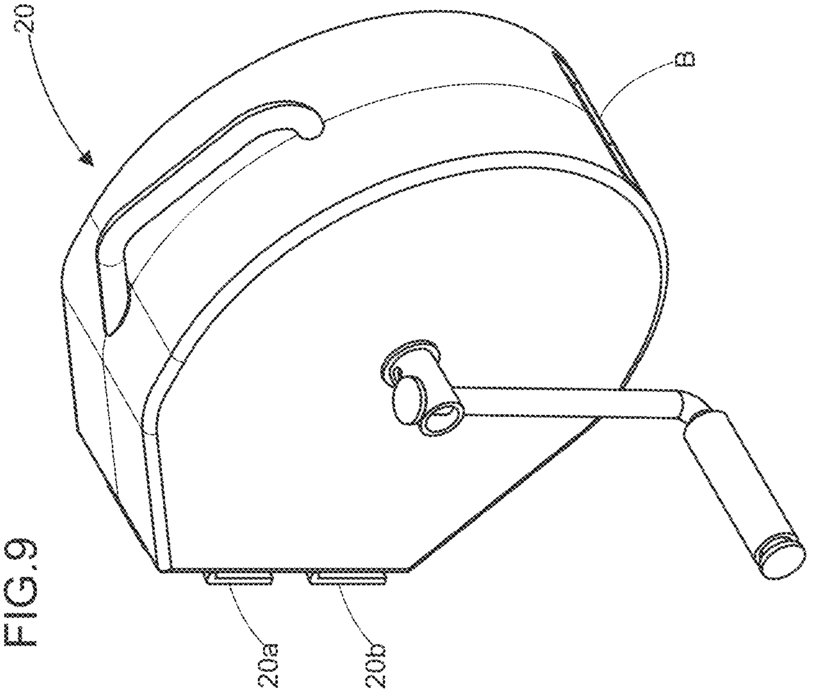

Each safety guide (12) of the anchor post (10) serves both for passage of the lifeline (LL) (FIG. 5A) and for fastening the end coupling (30) of the lifeline (FIG. 5B). Each safety guide (12) is formed by three arched segments (12*a*), (12*b*) and (12*c*), each of whose ends (S1) is welded to the side of anchor post (10) so that said arched segments remain parallel, closely spaced between each other and with the other end (S2) at a distance from the side of said post. The central arch (12*b*) is attached with the end (S2) inverted in relation to the extreme arches (12*a*)/(12*c*), composing a "passageway" for passage of the lifeline (LL) or the end coupling (30) of said lifeline. Therefore, the conformation and position of the arches (12*a*), (12*b*) and (12*c*) that compose the safety guide (12) guarantees full safety of the lifeline (LL), preventing its involuntary unwinding, and at the same time, is simple to assemble by the worker.

The transport handle (13) is configured by a tubular rod bent in segments, more precisely a rectilinear segment (13*a*) that passes through the anchor post (10) through holes (10*e*). Said rectilinear segment (13*a*) is bent into an arch (13*b*) with small radius, concordant with another rectilinear segment (13*c*), which is angular ($\alpha$) in relation to segment (13*a*), which ends in another bend forming an arch (13*d*) with large radius. Said handle, with that configuration, is efficient, and takes up very little space, which avoids accidents involving the worker.

The modular anchor post (10) can be extended by means of a coupling a complementary tube (40) with external diameter equal to the internal diameter of the anchor post (10). The assembly between the tube (40) and post (10) is telescopic and the adjustment between one and the other is accomplished by means of a locking pin or by the handle itself (13), more specifically the rectilinear segment (13*a*), which besides passing through the holes (10*d*) of the post (10), also passes through one of the pairs of holes (40*a*) drilled along and easy to assemble at the worksite.

The modular anchor post (10) also has a pair of brackets (14) to support the attachment of the retractable lifeline drum assembly (20). Said brackets are composed of two C-shapes (14*a*) and (14*b*) aligned lengthwise on the anchor post above the transport handle (13); each bracket has lateral ribs welded to the outside wall of the anchor post (10), so as to compose a "hollow cradle" (14*c*), especially dimensioned to receive the hooks (20*a*) and (20*b*) arranged in the plane (20*c*) of the retractable drum assembly (20), keeping said drum in an orthogonal position in relation to the anchor post (10), while at the same time keeping the nozzle (B) of said drum assembly from unrolling the lifeline.

In a preferential option, hook (20*a*) is slightly higher (y, not illustrated in Figures) than hook (20*b*), while the brackets (14*a*) and (14*b*) have the same height. This occurs so that the retractable drum assembly, even when subjected to forces and involuntary movements, does not become detached from the anchor post.

It should be understood that the preferred embodiments mentioned here are merely illustrative of the present invention. Numerous variations in design and use of the present invention may be contemplated in view of the following claims without straying from the intended scope and field of the invention herein disclosed.

The invention claimed is:

1. A system for assembling a provisional horizontal lifeline, comprising:

(a) a modular anchor post coupled to a complementary tube with telescopic adjustment means; said modular anchor post comprising:

a structural base having a plane region comprising all peripheral border edges of the structural base, the structural base also having a multiplicity of angular ribs welded to a side of the anchor post and connected at a bottom end to the plane region such that said plane region is slightly distanced away from said anchor post;

a hole drilled in a ground of a building that receives a tubular sector, arranged between an end and the plane region;

at least one safety guide, comprising three arched segments, wherein a central arched segment has one outside arched segment and located on either side;

at least one transport handle in a single piece; and at least two brackets for mounting and attachment of a retractable lifeline drum assembly.

2. The system according to claim 1, wherein the structural base is at least 30 cm above a bottom end of the anchor post.

3. The system according to claim 1, wherein in the structural base, the plane region is maintained orthogonal to an axis of the anchor post and rigidly stabilized by the angular ribs, wherein each angular rib comprises a vertical rib segment, the vertical rib segment welded on the side of the anchor post.

4. The system according to claim 1, wherein the three arched segments of the at least one safety guide each comprising:

a first end welded to the side of the anchor post so that said arched segments remain parallel and closely spaced with each other; and a second end located at a distance from the side of said anchor post wherein the central arched segment is attached to the second end inverted in relation to the outside arched segments.

5. The system according to claim 1, wherein the provisional horizontal lifeline passes through each safety guide of the anchor post, lodging in a center of the arched segments.

6. The system according to claim 1, wherein an end hook of the provisional horizontal lifeline is anchored in the arched segments.

7. The system according to claim 1, wherein the at least one transport handle comprising a tubular rod bent into segments, wherein a first rectilinear segment passes through the anchor post through holes and is welded to them; said rectilinear segment is bent, forming a first arch, concordant with a second rectilinear segment, angular in relation to the first rectilinear segment and ending in another bend into a second arch, wherein a radius of the first arch is smaller than a radius of the second arch.

8. The system according to claim 1, wherein the complementary tube having a pair of holes drilled along the complementary tube, the tube having an external diameter equal to an internal diameter of the anchor post; wherein the adjustment of the height between the tube and the anchor post is performed by a locking pin particularly configured for a rectilinear segment of the at least one transport handle, passing through holes drilled in said anchor post and at least one of the pair of holes along the complementary tube.

9. The system according to claim 1, wherein the at least two brackets and comprising members bent into a C-shape arranged lengthwise on the anchor post above the transport handle; each bracket's side ribs are welded on an outside wall of the anchor post, so as to compose a hollow cradle, especially dimensioned to receive two hooks arranged on a plane of the retractable drum assembly, keeping said drum assembly orthogonal in relation to the anchor post, and keeping a nozzle of said drum assembly from unwinding the lifeline.

10. The system according to claim 1, wherein the drum assembly comprising a first hook and a second hook, wherein the first hook is slightly higher than the second hook, while the two brackets have the same height.

* * * * *